United States Patent
Kim et al.

(10) Patent No.: US 10,122,958 B2
(45) Date of Patent: Nov. 6, 2018

(54) METHOD FOR RECORDING EXECUTION SCREEN AND ELECTRONIC DEVICE FOR PROCESSING THE SAME

(71) Applicant: Samsung Electronics Co., Ltd., Suwon-si, Gyeonggi-do (KR)

(72) Inventors: Joong Seob Kim, Seoul (KR); Dongkyung Kim, Yongin-si (KR); Taegun Park, Hwaseong-si (KR); Yangkyun Oh, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/277,250

(22) Filed: Sep. 27, 2016

(65) Prior Publication Data

US 2017/0111608 A1    Apr. 20, 2017

(30) Foreign Application Priority Data

Oct. 15, 2015   (KR) ........................ 10-2015-0144222

(51) Int. Cl.
| | |
|---|---|
| *H04N 5/04* | (2006.01) |
| *G06F 3/01* | (2006.01) |
| *G11B 27/10* | (2006.01) |
| *H04N 5/93* | (2006.01) |
| *A63F 13/426* | (2014.01) |
| *A63F 13/95* | (2014.01) |
| *H04N 21/422* | (2011.01) |
| *G11B 27/031* | (2006.01) |
| *H04N 5/76* | (2006.01) |
| *H04N 9/82* | (2006.01) |
| *H04N 21/433* | (2011.01) |

(Continued)

(52) U.S. Cl.
CPC ......... *H04N 5/9305* (2013.01); *A63F 13/285* (2014.09); *A63F 13/426* (2014.09); *A63F 13/497* (2014.09); *A63F 13/537* (2014.09); *A63F 13/95* (2014.09); *G11B 27/031* (2013.01); *G11B 27/10* (2013.01); *H04N 5/76* (2013.01); *H04N 9/8205* (2013.01); *H04N 21/422* (2013.01); *H04N 21/42201* (2013.01); *H04N 21/42222* (2013.01); *H04N 21/4334* (2013.01)

(58) Field of Classification Search
CPC ... G06F 3/01; G09G 5/18; H04N 5/04; G08B 6/00; G11B 27/10
USPC ................. 386/239, 248, 278, 282, 200, 201
See application file for complete search history.

(56) References Cited

U.S. PATENT DOCUMENTS

| | | | |
|---|---|---|---|
| 5,805,761 A | 9/1998 | Ikeda | |
| 9,261,960 B2 * | 2/2016 | Lacroix | .................. H04N 5/765 |

(Continued)

FOREIGN PATENT DOCUMENTS

| | | |
|---|---|---|
| EP | 2755399 A1 | 7/2014 |
| WO | 2014134452 A1 | 9/2014 |

OTHER PUBLICATIONS

European Search Report dated Aug. 18, 2018 Ref. P254045EP/DK.

*Primary Examiner* — Daquan Zhao
(74) *Attorney, Agent, or Firm* — Jefferson IP Law, LLP

(57) ABSTRACT

An electronic device and a method for recording a content execution screen are disclosed. The electronic device includes a memory and a processor electrically connected to the memory. The processor is configured to control for executing content, confirming at least one part of the content, and recording the at least one part of the content in association with a haptic effect.

20 Claims, 14 Drawing Sheets

(51) Int. Cl.
*A63F 13/497* (2014.01)
*A63F 13/537* (2014.01)
*A63F 13/285* (2014.01)
*G09G 5/18* (2006.01)

(56) References Cited

U.S. PATENT DOCUMENTS

| | | |
|---|---|---|
| 9,734,866 B2* | 8/2017 | Anderson ............ G11B 27/022 |
| 2005/0062841 A1 | 3/2005 | Rivera-Cintron |
| 2014/0093221 A1 | 4/2014 | Wikander |
| 2014/0155154 A1 | 6/2014 | Laakkonen et al. |
| 2014/0205260 A1 | 7/2014 | Lacroix et al. |
| 2014/0270681 A1 | 9/2014 | Sen et al. |
| 2015/0111649 A1 | 4/2015 | Liu et al. |
| 2015/0120817 A1 | 4/2015 | Jeong et al. |
| 2015/0189223 A1 | 7/2015 | Levesque et al. |
| 2015/0199024 A1 | 7/2015 | Birnbaum et al. |
| 2015/0268726 A1* | 9/2015 | Saboune ................. G06F 3/016 345/156 |
| 2016/0080682 A1* | 3/2016 | Diaz ...................... H04N 5/765 386/227 |
| 2016/0166929 A1* | 6/2016 | Rihn .................... A63F 13/285 463/37 |

* cited by examiner

METHOD FOR RECORDING EXECUTION SCREEN AND ELECTRONIC DEVICE FOR PROCESSING THE SAME

CROSS-REFERENCE TO RELATED APPLICATION(S)

This application claims the benefit under 35 U.S.C. § 119(a) of a Korean patent application filed on Oct. 15, 2015 in the Korean Intellectual Property Office and assigned Serial number 10-2015-0144222, the entire disclosure of which is hereby incorporated by reference.

TECHNICAL FIELD

The present disclosure relates to an apparatus and a method for recording a content execution screen. More particularly, the present disclosure relates to an apparatus and a method for storing control information and response information on the executed content when a content execution screen is recorded.

BACKGROUND

Recently, electronic devices that integrally perform one or more functions are gradually proliferating. Further, mobile terminals broadly classified as so-called "smart phones" mainly feature in such electronic devices. A mobile terminal typically includes a large screen touch-type display module, and includes a high-pixel camera module in addition to a basic function of communicating with the other party and is capable of capturing still images and moving images. Also, the mobile terminal can reproduce multimedia content, such as music, moving images, and the like, and can connect to a network and it can be configured to perform web surfing. The mobile terminal is gradually being equipped with one or more high-performance processors and thus can perform various functions.

Recently, the electronic device can generate and store various types of data. For example, the electronic device can generate recording data obtained by recording information, which is displayed on a screen, in the form of an image or a moving image.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for storing information associated with content control when recording data is generated. Typically, when an electronic device generates recording data, the electronic device only generates recording data including at least one piece of information among image information and audio information which are output according to the execution of content, and does not record control information on the content. Accordingly, when the recording data being stored is reproduced, a user cannot confirm a situation of controlling the content at the time of recording.

Another aspect of the present disclosure is to provide an apparatus and a method for separating recording information from control information and storing the recording information separated from the control information when recording data is generated.

Another aspect of the present disclosure is to provide an apparatus and a method for selectively outputting control information when recording data is reproduced.

In accordance with an aspect of the present disclosure, an electronic device is provided. The electronic device may include a memory and a processor electrically connected to the memory, wherein the processor is configured to control for executing content, confirming at least one part of the content, and recording the at least one part of the content in association with a haptic effect.

In accordance with another aspect of the present disclosure, an operating method of an electronic device is provided. The operating method includes executing content, confirming at least one part of the content, recording the at least one part of the content, acquiring additional information collected by at least one sensor while the at least one part of the content is recorded, and storing the collected information in association with recording data.

In accordance with another aspect of the present disclosure, a non-transitory computer-readable recording medium is provided. The non-transitory computer-readable recording medium may store a program for executing operations including executing content, confirming at least one part of the content, recording the at least one part of the content, acquiring additional information collected by at least one sensor while the at least one part of the content is recorded, and storing the collected information in association with recording data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
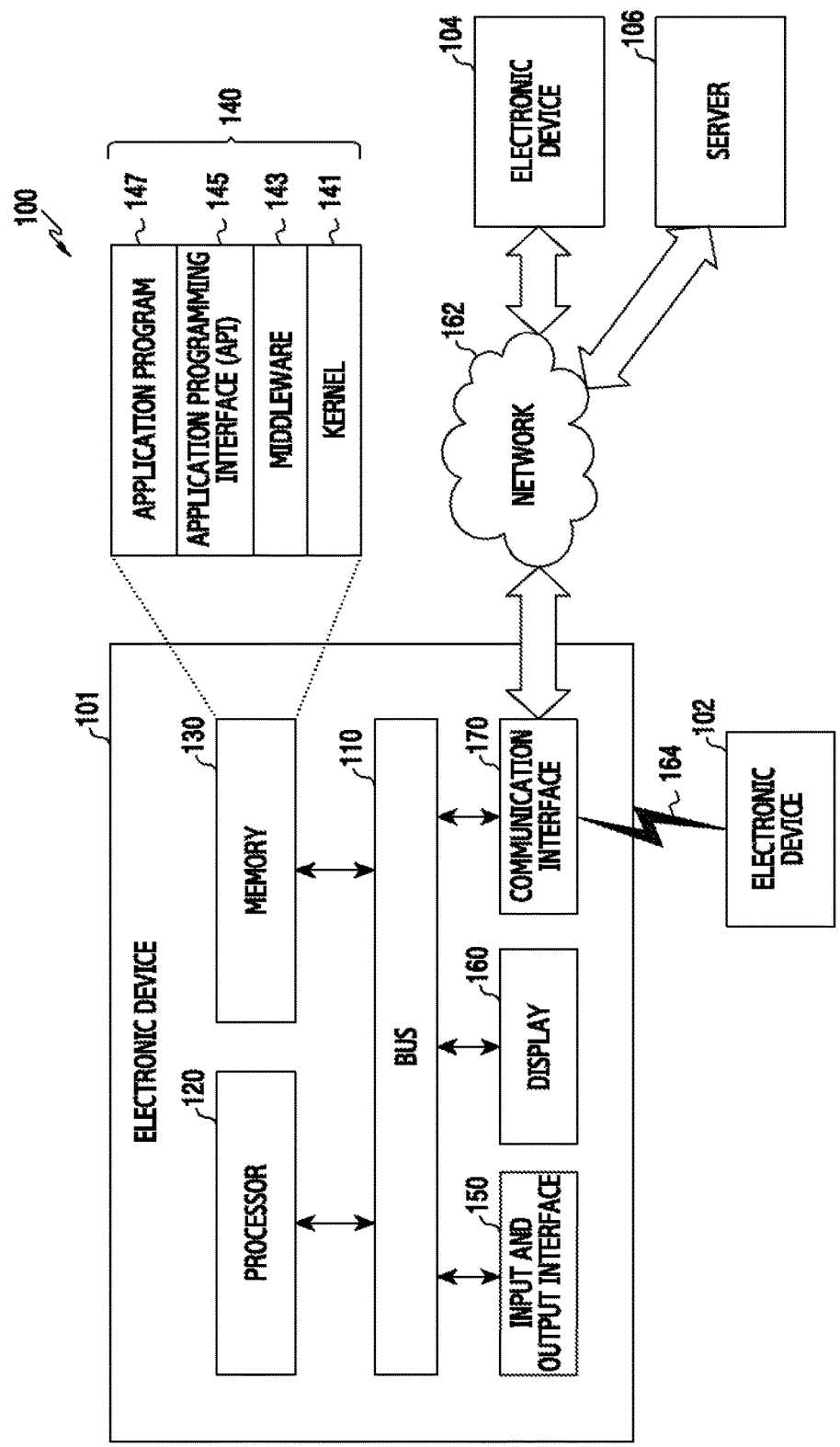
FIG. 1 is a block diagram illustrating an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may be a device. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments, an electronic device may be a smart home appliance. For example, of such appliances may include at least one of: a television (TV); a digital versatile disc (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync™, Apple TV™, or Google TV™); a game console (e.g., Xbox™, PlayStation™); an electronic dictionary; an electronic key; a camcorder; or an electronic frame.

In other embodiments, an electronic device may include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like)

In certain embodiments, an electronic device may include at least one of: a piece of furniture or a building/structure; an electronic board; an electronic signature receiving device; a projector; and various measuring instruments (e.g., a water meter, an electricity meter, a gas meter, or a wave meter).

An electronic device according to various embodiments of the present disclosure may also include a combination of one or more of the above-mentioned devices. Further, it will be apparent to those skilled in the art that an electronic device according to various embodiments of the present disclosure is not limited to the above-mentioned devices.

FIG. 1 is a view illustrating a network environment 100 including an electronic device 101 according to various embodiments of the present disclosure.

Referring to FIG. 1, the electronic device 101 may include a bus 110, a processor 120, a memory 130, an input/output (I/O) interface 150, a display 160, and a communication interface 170.

The bus 110 may be a circuit for connecting the above-described elements (e.g., the processor 120, the memory 130, the I/O interface 150, the display 160 or the communication interface 170, etc.) with each other, and transferring communication (e.g., a control message) between the above-described elements.

The processor 120 may include a central processing unit (CPU), a communication processor (CP), a graphic processing unit (GPU), and the like.

The processor 120 may receive, for example, an instruction from the above-described other elements (e.g., the memory 130, the I/O interface 150, the display 160, or the communication interface 170, etc.) via the bus 110, decipher the received instruction, and execute an operation or a data process corresponding to the deciphered instruction.

The memory 130 may include any suitable type of volatile or non-volatile memory. The memory 130 may store an instruction or data received from the processor 120 or other elements (e.g., the I/O interface 150, the display 160, or the communication interface 170, etc.), or generated by the processor 120 or other elements. The memory 130 may include, for example, programming modules 140 such as a kernel 141, a middleware 143, an application programming interface (API) 145, or an application 147. The each of the programming modules may be configured using a software, a firmware, a hardware, or a combination of two or more of these.

Referring to FIG. 1, the kernel 141 may control or manage system resources (e.g., the bus 110, the processor 120, or the memory 130, etc.) used for executing an operation or a function implemented in the rest of the programming modules, for example, the middleware 143, the API 145, or the application 147. Also, the kernel 141 may provide an interface for allowing the middleware 143, the API 145, or the application 147 to access an individual element of the electronic device 101 and control or manage the same.

The middleware 143 may perform a mediation role so that the API 145 or the application 147 may communicate with the kernel 141 to give and take data. Also, in connection with task requests received from the applications 147, the middleware 143 may perform a control (e.g., scheduling or load balancing) for a task request using, for example, a method of assigning priority that may use a system resource (e.g., the bus 110, the processor 120, or the memory 130, etc.) of the electronic device 101 to at least one application 134.

The API 145 is an interface for allowing the application 147 to control a function provided by the kernel 141 or the middleware 143, and may include at least one interface or function (e.g., an instruction) for file control, window control, image processing, or character control, etc.

The I/O interface 150 may transfer an instruction or data input from a user via an I/O unit (e.g., a sensor, a keyboard, or a touchscreen) to the processor 120, the memory 130, or the communication interface 170 via the bus 110, for example. For example, the I/O interface 150 may provide data regarding a user's touch input via the touchscreen to the processor 120. Also, the I/O interface 150 may, for example, output an instruction or data received via the bus 110 from the processor 120, the memory 130, or the communication interface 170 via the I/O unit (e.g., a speaker or a display). For example, the I/O interface 150 may output voice data processed by the processor 120 to a user via a speaker.

The display 160 may include, for example, a liquid crystal display (LCD), a light emitting diode (LED) display, an organic light emitting diode (OLED) display, a plastic OLED (POLED), a micro electro mechanical system (MEMS) display, or an electronic paper display. The display 160 may display various types of contents (for example, text, images, videos, icons, or symbols) for users. The display 160 may include a touch screen, and may receive, for example, a touch, gesture, proximity, or hovering input by using an electronic pen or a part of the user's body.

The communication interface 170 may connect communication between the electronic device 101 and an external device (for example, the electronic device 104 or the server 106). For example, the communication interface 170 may be connected to a network 162 through wireless communication 164 or wired communication, and may communicate with an external device. The communication interface 170 may communicate with the electronic device 102 via the wireless communication 164, as illustrated in FIG. 1.

The wireless communication may use at least one of, for example, long term evolution (LTE), LTE-Advance (LTE-A), code division multiple access (CDMA), Wideband CDMA (WCDMA), universal mobile telecommunications system (UMTS), wireless broadband (WiBro), and global system for mobile communications (GSM) as a cellular communication protocol.

The wired communication may include, for example, at least one of universal serial bus (USB), high definition multimedia interface (HDMI), recommended standard 232 (RS-232), and plain old telephone service (POTS).

The network 162 may include at least one of communication networks such as a computer network (for example, a local area network (LAN) or a wide area network (WAN)), the Internet, and a telephone network.

The electronic devices 102 and 104 may be devices of the same type as that the electronic device 101 or devices of different types from that of the electronic device 101. According to an embodiment, the server 106 may include a group of one or more servers. According to various embodiments, all or some of the operations executed in the electronic device 101 may be carried out in another electronic device or a plurality of electronic devices (for example, the electronic device 102 or 104 and the server 106). According to an embodiment, when the electronic device 101 should perform some functions or services automatically or by a request, the electronic device 101 may make a request for performing at least some functions related to the functions or services to another device (for example, the electronic device 102 or 104, or the server 106) instead of performing the functions or services by itself or additionally. The electronic device (for example, the electronic device 102 or 104, or the server 106) may carry out the functions requested by the electronic device 101 or additional functions and provide results thereof to the electronic device 101. The electronic device 101 may provide the requested functions or services to another electronic device based on the received results or after additionally processing the received results. To this end, for example, cloud computing, distributed computing, or client-server computing technology may be used.

Figure 2:
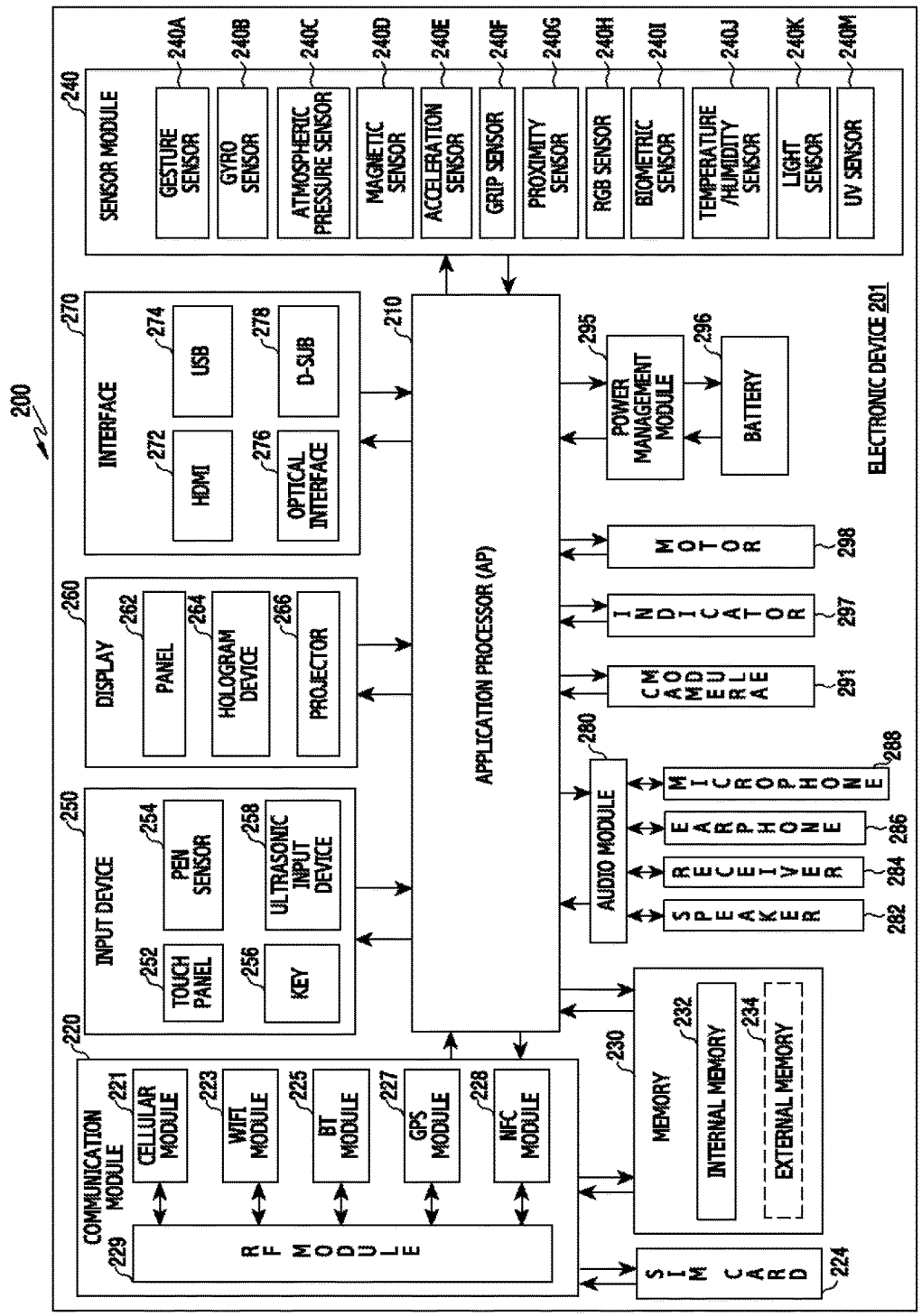
FIG. 2 is a block diagram illustrating a configuration of an electronic device according to various embodiments of the present disclosure.

FIG. 2 is a block diagram 200 illustrating an electronic device 201 according to various embodiments of the present disclosure. The electronic device 201 may configure, for example, all or a portion of the electronic device 101 illustrated in FIG. 1.

Referring to FIG. 2, the electronic device 201 may include one or more application processors (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, or a motor 298.

The AP 210 may drive an OS or an application to control a plurality of hardware or software elements connected to the AP 210, and perform various data processes including multimedia data and operations. The AP 210 may be implemented, for example, as a system on chip (SoC). According to an embodiment, the AP 210 may further include at least one of a graphic processing unit (GPU) or image signal processor (ISP). According to an embodiment, the AP 210 may be implemented to include at least a portion (e.g., the cellular module 221) of the above-described elements. Also, the AP 210 may store data received from at least one of other elements or generated by at least one of other elements in a non-volatile memory.

The communication module 220 (e.g., the communication interface 170) may perform data transmission/reception in communication between the electronic device 201 (e.g., the electronic device 101 shown in FIG. 1) and other electronic devices (e.g., the electronic device 104 or the server 106 shown in FIG. 1) connected via a network. According to an embodiment, the communication module 220 may include a cellular module 221, a wireless fidelity (Wi-Fi) module 223, a Bluetooth (BT) module 225, a GPS module 227, a near field communication (NFC) module 228, and a radio frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identify module (e.g., a SIM card 224). According to an embodiment, the cellular module 221 may perform at least a portion of functions that may be provided by the AP 210. According to an embodiment, the cellular module 221 may include a communication processor (CP). Also, the cellular module 221 may be, for example, implemented as a SoC. Though elements such as the cellular module 221 (e.g., a communication processor (CP)), the memory 230, or the power management module 295, etc. are illustrated as elements separated from the AP 210 in FIG. 2, according to an embodiment, the AP 210 may be implemented to include at least a portion (e.g., the cellular module 221) of the above-described elements.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one integrated circuit (IC) or an IC package. For example, at least a portion (e.g., a CP corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

Referring to FIG. 2, the RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identify module, and may be inserted into a slot formed in a specific position of the electronic device. The SIM card 224 may include unique identify information (e.g., integrated circuit card identifier (ICCID)) or subscriber information (e.g., international mobile subscriber identity (IMSI)).

The memory 230 (e.g., the memory 20) may include a built-in memory 232 or an external memory 234. The built-in memory 232 may include, for example, at least one of a volatile memory (e.g., dynamic random access memory (DRAM), static RAM (SRAM), synchronous dynamic RAM (SDRAM)) and a non-volatile memory (e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 may be a solid state drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 201 via various interfaces. According to an embodiment, the electronic device 201 may further include a storage device (or a storage medium) such as a hard drive.

Referring to FIG. 2, the sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor or a red, green, blue (RGB) sensor 240H, a living body sensor or biometric sensor 240I, a temperature/humidity sensor 240J, an illuminance sensor or light sensor 240K, or an ultraviolet (UV) sensor 240M. Additionally or alternatively, the sensor module 240 may include, for example, an electronic nose (E-nose) sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include a touch panel 252, a digital stylus or (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The digital stylus or (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

Referring to FIG. 2, the display 260 (e.g., the display 160 shown in FIG. 1) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 150 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage power of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

Referring to FIG. 2, the indicator 297 may display a specific state of the electronic device 201 or a portion thereof (e.g., the AP 210), for example, a booting state, a message state, or a charging state, etc. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

The aforementioned elements of the electronic device according to various embodiments of the present disclosure may be constituted by one or more components, and the name of the corresponding element may vary with a type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 3:
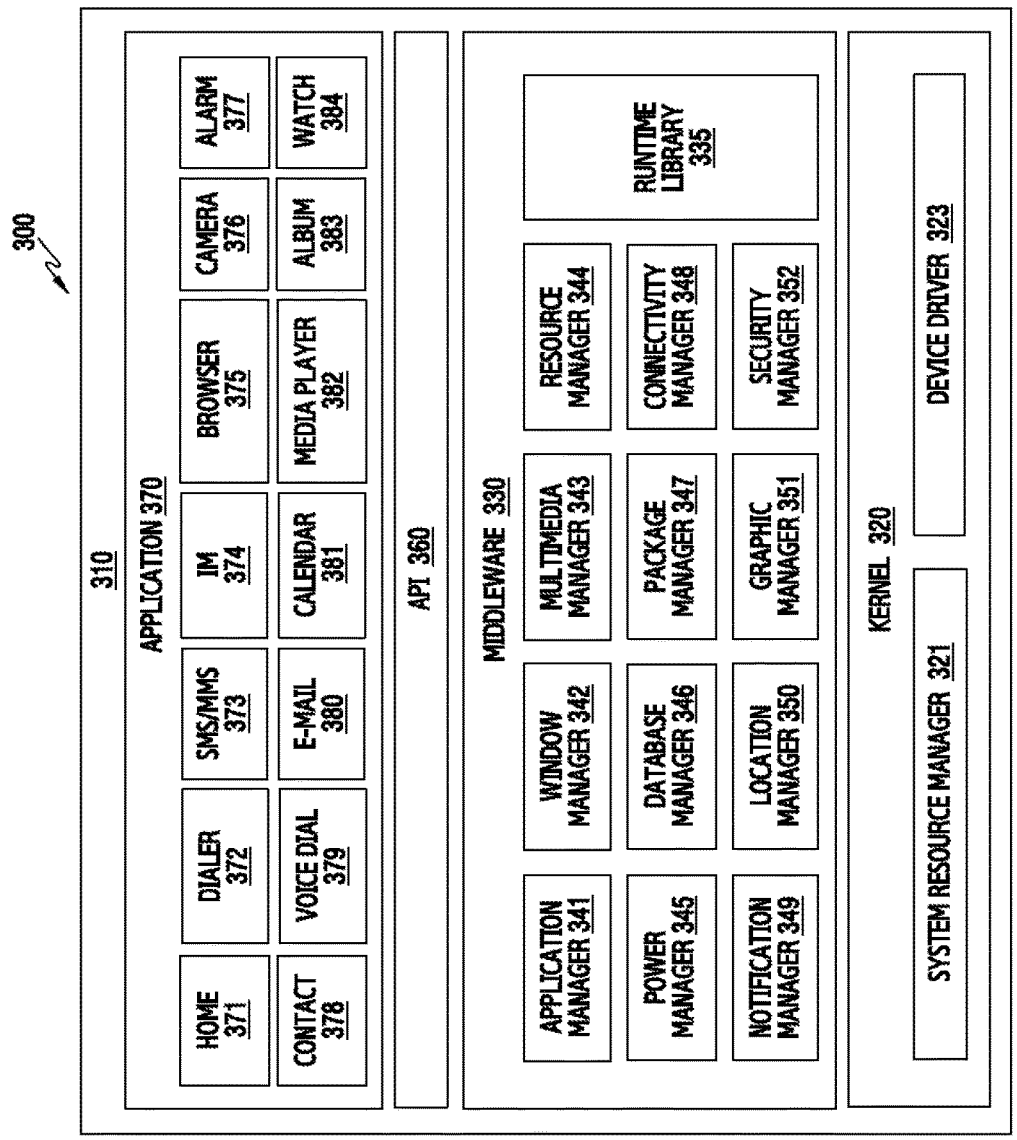
FIG. 3 is a block diagram illustrating a configuration of a program module according to various embodiments of the present disclosure.

FIG. 3 is a block diagram 300 of a program module 310 according to an embodiment of the present disclosure.

Referring to FIG. 3, the program module 310 (for example, the programs 140 shown in FIG. 1) may include an operating system (OS) for controlling resources related to the electronic device (for example, the electronic device 101 shown in FIG. 1) and/or various applications (for example, the application programs 147 shown in FIG. 1) executed in the operating system. The operating system may be, for example, Android, iOS, Windows, Symbian, Tizen, Bada, or the like.

The programming module 310 may include a kernel 320, middleware 330, an API 360, and/or applications 370. At least some of the program module 310 may be preloaded in the electronic device or downloaded from the server.

The kernel 320 (for example, the kernel 141 shown in FIG. 1) may include, for example, a system resource manager 321 or a device driver 323. The system resource manager 321 may control, allocate, or collect the system resources. According to an embodiment, the system resource manager 321 may include a process management unit, a memory management unit, or a file system management unit. The device driver 323 may include, for example, a display driver, a camera driver, a Bluetooth (BT) driver, a shared-memory driver, a USB driver, a keypad driver, a WiFi driver, an audio driver, or an inter-process communication (IPC) driver.

Referring to FIG. 3, the middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143 shown in FIG. 1) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The runtime library 335 may perform input/output management, memory management, or a function for an arithmetic function.

The application manager 341 may manage, for example, a life cycle of at least one of the applications 370. The window manager 342 may manage graphical user interface (GUI) resources used by a screen. The multimedia manager 343 may grasp formats required for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a basic input/output system (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of, for example, Wi-Fi or BT. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to an embodiment, when the electronic device (for example, electronic device 101 shown in FIG. 1) has a call function, the middleware 330 may further include a telephony manager for managing a voice call function or a video call function of the electronic device.

Referring to FIG. 3, the middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 145 shown in FIG. 1) is, for example, a set of API programming functions, and a different configuration thereof may be provided according to an operating system. For example, Android® or iOS® may provide one API set per platform, and Tizen® may provide two or more API sets per platform.

The applications 370 (for example, the application programs 147 shown in FIG. 1) may include, for example, one or more applications which can provide functions such as home 371, dialer 372, short message service (SMS)/multimedia message service (MMS) 373, instant message (IM) 374, browser 375, camera 376, alarm 377, contacts 378, voice dialer 379, email 380, calendar 381, media player 382, album 383, clock or watch 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of the description) supporting information exchange between the electronic device (for example, the electronic device 101 shown in FIG. 1) and an external electronic device. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device, 101 shown in FIG. 1, (for example, an SMS/MMS application, an e-mail application, a health management application, or an environmental information application). Further, the notification relay application may receive notification information from, for example, a control device and provide the received notification information to the user. The device management application may manage (for example, install, delete, or update), for example, a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include an application (for example, health management application) designated according to attributes of the external electronic device (for example, attributes of the electronic device such as the type of electronic device which corresponds to a mobile medical device). According to an embodiment, the applications 370 may include an application received from the external electronic devices (for example, the server or the electronic device). According to an embodiment, the applications 370 may include a preloaded application or a third party application which can be downloaded from the server. The names of the components of the program module 310 according to the embodiment illustrated in FIG. 3 may vary according to the type of operating system.

According to various embodiments, at least some of the programming module 310 may be implemented by software, firmware, hardware, or a combination of two or more thereof. At least some of the programming module 310 may be implemented (for example, executed) by, for example, the processor (for example, the application program). At least some of the programming module 310 may include, for example, a module, program, routine, sets of instructions, or process for performing one or more functions.

Figure 4A:
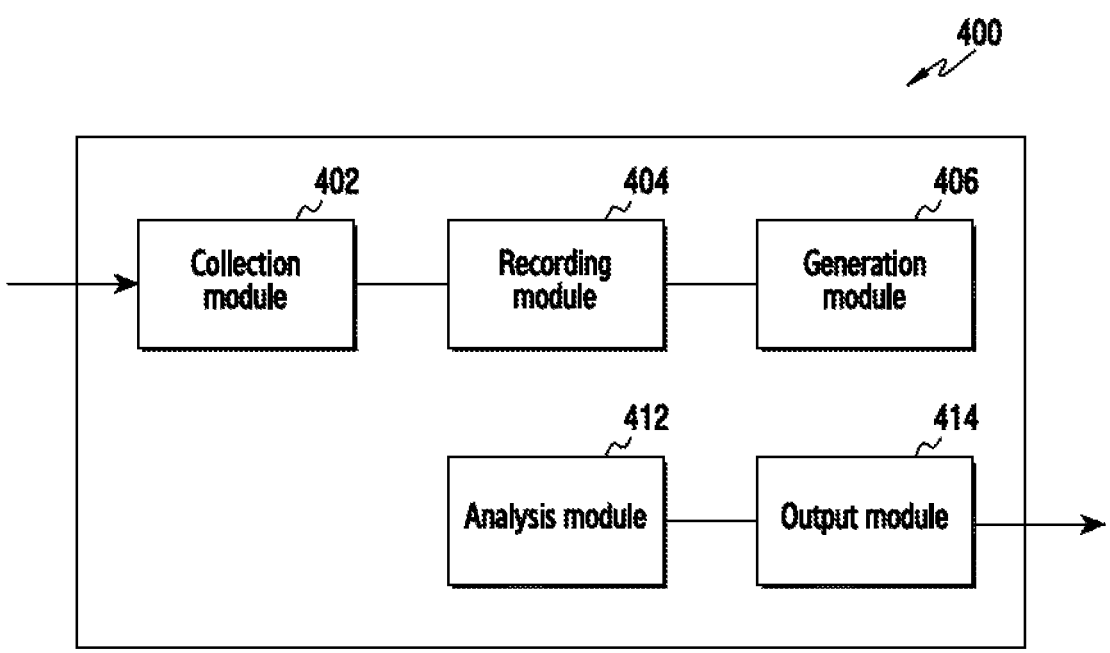
FIG. 4A is a block diagram illustrating a configuration of a processor according to various embodiments of the present disclosure.

FIG. 4A is a block diagram illustrating a configuration of a processor 400 according to various embodiments of the present disclosure. According to various embodiments of the present disclosure, the processor 400 may be a processor (e.g., the processor 120) of an electronic device (e.g., the electronic device 101).

Referring to FIG. 4A, the processor 400 may include a collection module 402, a recording module 404, a generation module 406, an analysis module 412, and an output module 414.

According to various embodiments of the present disclosure, the collection module 402 may collect control information and response information on content. According to an embodiment of the present disclosure, the collection module 402 may collect control information and response information in a situation of recording the executed content. According to various embodiments of the present disclosure, the collection module 402 may collect control information on the basis of at least one sensor. According to an embodiment of the present disclosure, the collection module 402 may collect information associated with an input, which controls a function or an operation of the executed content, on the basis of at least one of a microphone, a touch sensor, a touch screen, a gyro sensor, and a gesture sensor. For example, with respect to a touch input, the collection module 402 may collect a position of the occurrence of the touch input, the number of times of the touch input, a time period for maintaining the touch input, and the like. As another example, with respect to a voice input, the collection module 402 may collect a time point of detecting the voice input, a designated control command corresponding to the voice input, and the like. According to various embodiments of the present disclosure, the collection module 402 may collect response information on the basis of at least one sensor. The response information may be associated with an effect, which may occur in the electronic device due to the execution of content during recording, and a response of a user to the execution of content during recording. According to an embodiment of the present disclosure, the collection module 402 may collect response information on content during recording on the basis of at least one of a biometric sensor, a magnetic sensor, an acceleration sensor, an inertial sensor, a microphone, and a vibration sensor. For example, with respect to the occurrence of a haptic effect (e.g., a vibration effect), the collection module 402 may collect a time period for the occurrence of a haptic effect, a haptic pattern, and the like. As another example, the collection module 402 may collect biometric information, which satisfies a pre-designated condition among pieces of biometric information of the user measured during recording, a time point of acquiring the biometric information, and the like.

According to various embodiments of the present disclosure, with reference to FIG. 4A, the recording module 404 may record and store image information, which is output on a screen of the electronic device according to the execution of content, and audio information which is output through a speaker of the electronic device.

According to various embodiments of the present disclosure, the generation module 406 may store the control information and the response information, which have been collected by the collection module 402, as separate data. According to various embodiments of the present disclosure, the generation module 406 may store the collected control information and response information in association with recording data. According to an embodiment of the present disclosure, the generation module 406 may add identifiers (e.g., storage locations) for the control information and the response information, which are separately stored, to a header of the recording data. In another embodiment of the present disclosure, the generation module 406 may insert, as additional information, the control information and the response information into the recording data. According to various embodiments of the present disclosure, the control information and the response information may be stored as meta information of the recording data.

According to various embodiments of the present disclosure, the analysis module 412 may determine whether there exist control information and response information associated with recording data being reproduced. According to an embodiment of the present disclosure, the analysis module 412 may analyze a header included in the recording data and may determine whether the control information and the response information exist.

According to various embodiments of the present disclosure, the output module 414 may output a reproduction screen of recording data. According to various embodiments of the present disclosure, the output module 414 may output the control information and the response information while outputting the reproduction screen of the recording data.

According to various embodiments of the present disclosure, at least one of the collection module 402, the recording module 404, the generation module 406, the analysis module 412, and the output module 414 may be omitted from the configuration of the processor 400, and the processor 400 may additionally include another element. According to various embodiments of the present disclosure, the collection module 402, the recording module 404, the generation module 406, the analysis module 412, and the output module 414 of the processor 400 may be at least one software element executed by the processor 400.

Figure 4B:
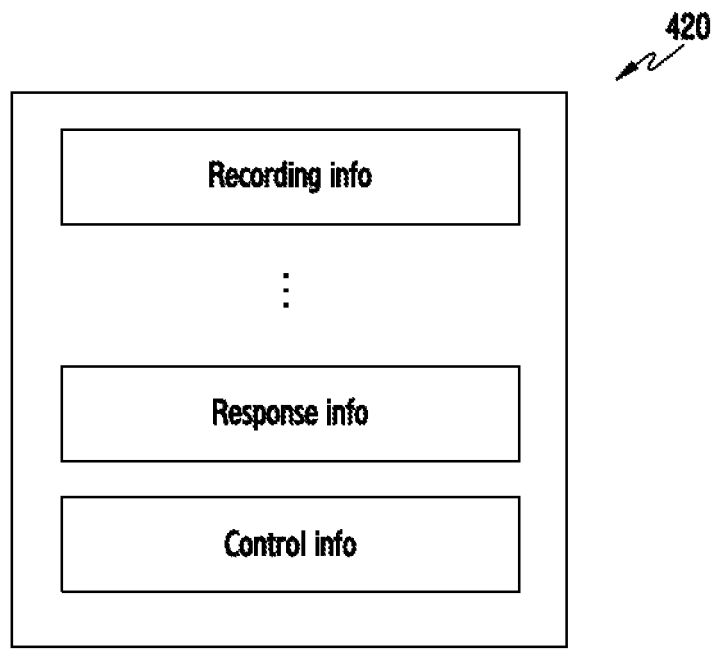
FIG. 4B is a view illustrating a configuration of recording data according to various embodiments of the present disclosure.

FIG. 4B is a view illustrating a configuration of recording data 420 according to various embodiments of the present disclosure.

Referring to FIG. 4B, the recording data 420 may include recording information. According to an embodiment of the present disclosure, the recording information may include image information and audio information recorded with respect to the executed content. According to various embodiments of the present disclosure, the recording data 420 may be one datum including response information and control information. According to an embodiment of the present disclosure, the response information and the control information may be additional information on the recording data 420. For example, the recording data 420 may include respective headers of the recording information, the response information, and the control information. Accordingly, when the recording data 420 is reproduced, at least one piece of information among the recording information, the response information, and the control information may be selectively reproduced or may not be reproduced.

Although not illustrated, according to various embodiments of the present disclosure, the recording data 420 may be generated in the form of being separated from at least one piece of information among the response information and the control information.

The electronic device according to various embodiments of the present disclosure may include a memory and a processor electrically connected to the memory. According to an embodiment of the present disclosure, the processor may perform a control operation for executing content, confirming at least one part of the content, and recording the at least one part of the content in association with a haptic effect.

According to various embodiments of the present disclosure, the processor may perform a process for acquiring haptic information, which corresponds to the haptic effect, from the content.

According to various embodiments of the present disclosure, the processor may perform a process for acquiring haptic information, which corresponds to the haptic effect, from the electronic device or an external device connected to the electronic device.

According to various embodiments of the present disclosure, the content may include image information.

According to various embodiments of the present disclosure, the content may include text information.

According to various embodiments of the present disclosure, the processor may perform a process for associating the haptic effect on the basis of situation information related to the electronic device or a user of the electronic device.

According to various embodiments of the present disclosure, the processor may perform a process for associating the haptic effect on the basis of situation information related to an external device connected to the electronic device through a communication module.

According to various embodiments of the present disclosure, the processor may perform a process for associating the haptic effect in response to a recording command over the at least one part of the content.

According to various embodiments of the present disclosure, the processor may perform a control operation for storing haptic information, which corresponds to the haptic effect, as metadata in a file related to the at least one part of the content.

According to various embodiments of the present disclosure, the processor may perform a control operation for storing haptic information, which corresponds to the haptic effect, as the at least one part of the content.

According to various embodiments of the present disclosure, the processor may perform a control operation for confirming an attribute related to the at least one part of the content. When the attribute is a first designated value, the processor may perform a control operation for storing first haptic information, which enables the haptic effect to be performed as a first value, as at least one part of haptic information, and when the attribute is a second designated value, the processor may perform a control operation for storing second haptic information, which enables the haptic effect to be performed as a second value, as the at least one part of the haptic information.

According to various embodiments of the present disclosure, the processor may perform a control operation for confirming an attribute related to the at least one part of the content, When the attribute is a first designated attribute, the processor may perform a control operation for storing first haptic information, which enables the haptic effect to be performed as a first haptic effect, as at least one part of haptic information, and when the attribute is a second designated attribute, the processor may perform a control operation for storing second haptic information, which enables the haptic effect to be performed as a second haptic effect, as the at least one part of the haptic information.

Figure 5:
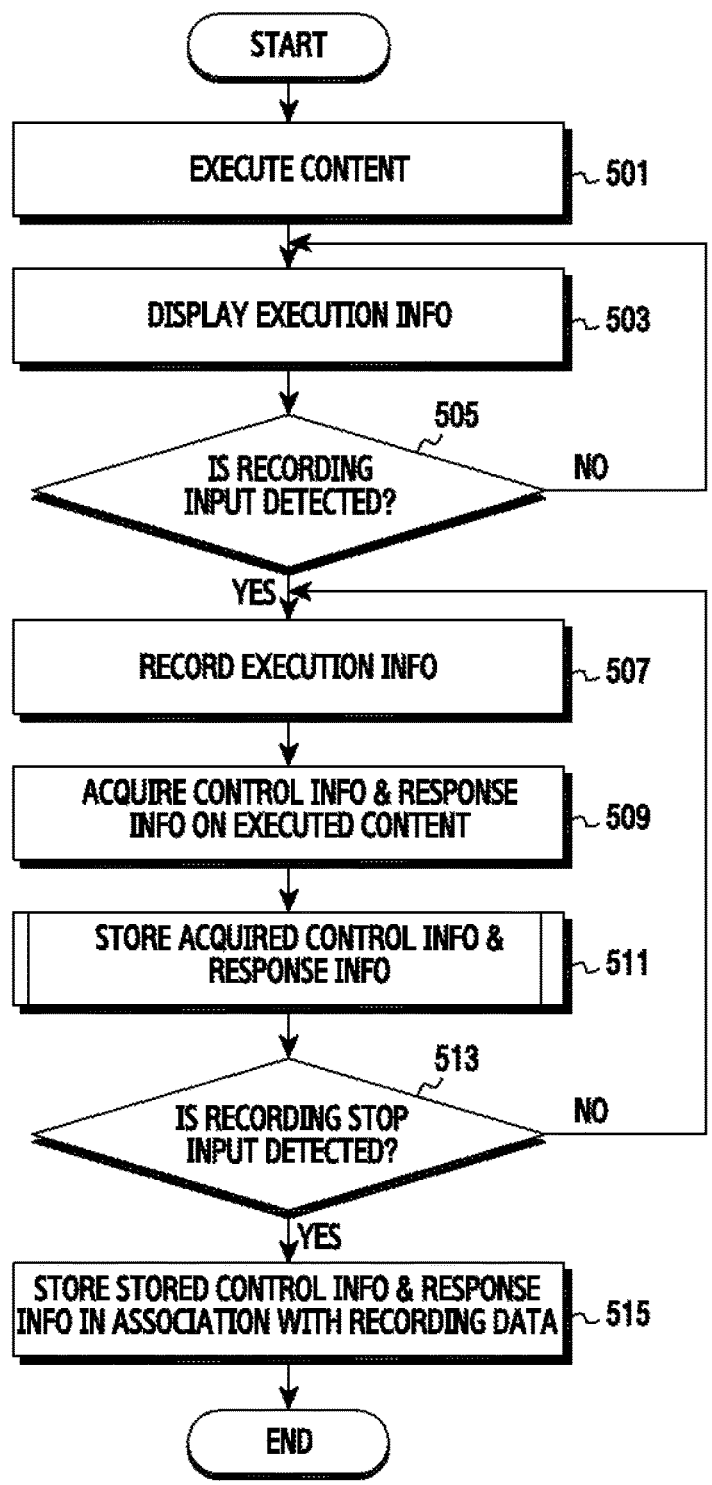
FIG. 5 is a flowchart illustrating a recording operation of an electronic device according to various embodiments of the present disclosure.

FIG. 5 is a flowchart illustrating a recording operation of the electronic device 101 according to an embodiment of the present disclosure.

According to an embodiment of the present disclosure, the electronic device 101 may be the electronic device 201, the processor 120, and the processor 400.

Referring to FIG. 5, in operation 501, the electronic device 101 (shown in FIG. 1) may execute content. According to an embodiment of the present disclosure, the electronic device 101 may execute at least one piece of content on the basis of an input (e.g., a key input, a touch input, a gesture input, a voice input, etc. for executing content) by a user. For example, the content may include one or more of a web page, digital document data, audio data, video data, image data, and an application executable by the electronic device 101. According to various embodiments of the present disclosure, the execution of the content may include a movement to another electronic device.

In operation 503, the electronic device 101 may display, on the screen, execution information according to the execution of the content. According to an embodiment of the present disclosure, the execution information is an execution screen according to the execution of content, and may include at least one object. The object may include at least one of at least one icon and a control menu which are included in the execution screen. For example, the execution information may be an execution screen of game content, an execution screen of a web browser, a reproduction screen of video data, and the like. In addition, the execution information may include audio information (e.g., an effect sound) which is output through the speaker of the electronic device 101 according to the execution of content.

In operation 505, the electronic device 101 may determine whether a recording input has been detected. According to various embodiments of the present disclosure, the recording input may be a pre-designated input indicating that the displayed execution information is recorded. According to an embodiment of the present disclosure, the recording input may be generated on the basis of at least one of a gesture input, a key input, a touch input, and a voice input.

When the recording input has not been detected in operation 505, the electronic device 101 may perform an operation of displaying the execution screen of the content.

When the recording input has been detected in operation 505, the electronic device 101 (shown in FIG. 1) may record the execution information in operation 507. According to an embodiment of the present disclosure, the electronic device 101 may record and store at least one piece of information among execution information which is output through the screen and execution information which is output through the speaker. According to various embodiments of the present disclosure, the electronic device 101 may determine a time point of recording the execution information on the basis of a time point of detecting the recording input. For example, the electronic device 101 may record the execution information which begins to be displayed from the time point of detecting the recording input. As another example, the electronic device 101 may record the execution information displayed from a time point which is faster by a designated time period (e.g., 5 seconds) than the time point of detecting the recording input, or may record the execution information displayed from a time point which is later by the designated time period (e.g., 5 seconds) than the time point of detecting the recording input.

In operation 509, the electronic device 101 may acquire control information and response information on the executed content through at least one sensor. According to various embodiments of the present disclosure, the control information may be associated with an input which controls a function or an operation of the executed content. For example, the control information may include at least one of an input which stops the execution of content, an input which resumes the stopped execution of the content, and an input which changes execution information (e.g., an execution screen) of the executed content. According to an embodiment of the present disclosure, the control information may be associated with an input which selects at least one object of the execution information displayed on the screen. For example, the electronic device 101 may acquire, as the control information, a position at which a touch input has occurred while the recording operation is performed, the number of times of the touch input, a time period during which the touch input is maintained, and the like. According to an embodiment of the present disclosure, the control information, which selects an object, may be acquired through a key input, a voice input, a gesture input, and the like in addition to the touch input. For example, when a key input, a voice input, a gesture input, and the like are detected which control a function or an operation of content, the electronic device 101 (shown in FIG. 1) may acquire, as the control information, information on the type of the input and information on a time point of detecting the input, and the like. The type of the input may be a control command corresponding to the voice input, the tilt of the electronic device corresponding to the gesture input, and the like.

According to various embodiments of the present disclosure, the response information may be associated with an effect (e.g., a haptic effect, a light-emitting effect, an olfactory effect, etc.) which may occur in the electronic device 101 due to the execution of content during recording. According to an embodiment of the present disclosure, when content providing a haptic function is executed, the electronic device 101 may acquire, as the response information, information associated with a time point of occurrence of a haptic effect (e.g., a vibration effect), a haptic pattern, and the like. According to another embodiment of the present disclosure, when content providing an olfactory effect is executed, the electronic device 101 may acquire, as the response information, information associated with a time point of occurrence of the olfactory effect, an occurrence pattern, the type (e.g., the type of scent) of an effect, and the like. According to still another embodiment of the present disclosure, when content providing a light-emitting function is executed, the electronic device 101 may acquire, as the response information, information associated with a time point of occurrence of the light-emitting effect, a light-emitting pattern, and the like. According to various embodiments of the present disclosure, the response information may be associated with a response of the user to the execution of the content during recording. According to an embodiment of the present disclosure, the response of the user may be a voice (or a shout) which is input through the microphone of the electronic device. According to another embodiment of the present disclosure, the response of the user may be biometric information (e.g., blood pressure, heart rate, etc.) measured through the biometric sensor (e.g., biometric sensor 240I shown in FIG. 2) of the electronic device 101 (e.g., electronic device 201 in FIG. 2). According to various embodiments of the present disclosure, the electronic device 101 may acquire the control information and the response information through an external electronic device (e.g., a device worn by the user's body) 101 connected to the electronic device 101 according to a short-range communication scheme.

Referring to FIG. 5, in operation 511, the electronic device 101 may store the acquired control information and response information.

In operation 513, the electronic device 101 may determine whether a recording stop input has been detected. According to various embodiments of the present disclosure, the recording stop input may be a pre-designated input which indicates the recording stop of the displayed execution information. According to an embodiment of the present disclosure, the recording stop input may be generated on the basis of at least one of a gesture input, a key input, a touch input, and a voice input.

When the recording stop input has not been detected in operation 513, the electronic device 101 may perform an operation of recording the execution information. According to an embodiment of the present disclosure, the electronic device 101 may perform an operation associated with operation 507.

When the recording stop input has been detected in operation 513, in operation 515, the electronic device 101 may store the stored control information and response information in association with recording data. According to an embodiment of the present disclosure, the electronic device 101 may store the control information and the response information in such a manner that the control information and the response information may be selectively reproduced when the recording data is reproduced. In an embodiment of the present disclosure, the electronic device 101 may store the control information and the response information as special data separated from recording data on the execution information. For example, the electronic device 101 may add identifiers (e.g., storage locations) for the control information and the response information to a header of the recording data. In another embodiment of the present disclosure, the electronic device 101 may insert, as additional information, the control information and the response information into the recording data. For example, the recording data may include a header for the control information and the response information inserted as additional information.

According to various embodiments of the present disclosure, at least one of operations 501 to 515 may be omitted. For example, operation 505 may be omitted.

Figure 6:
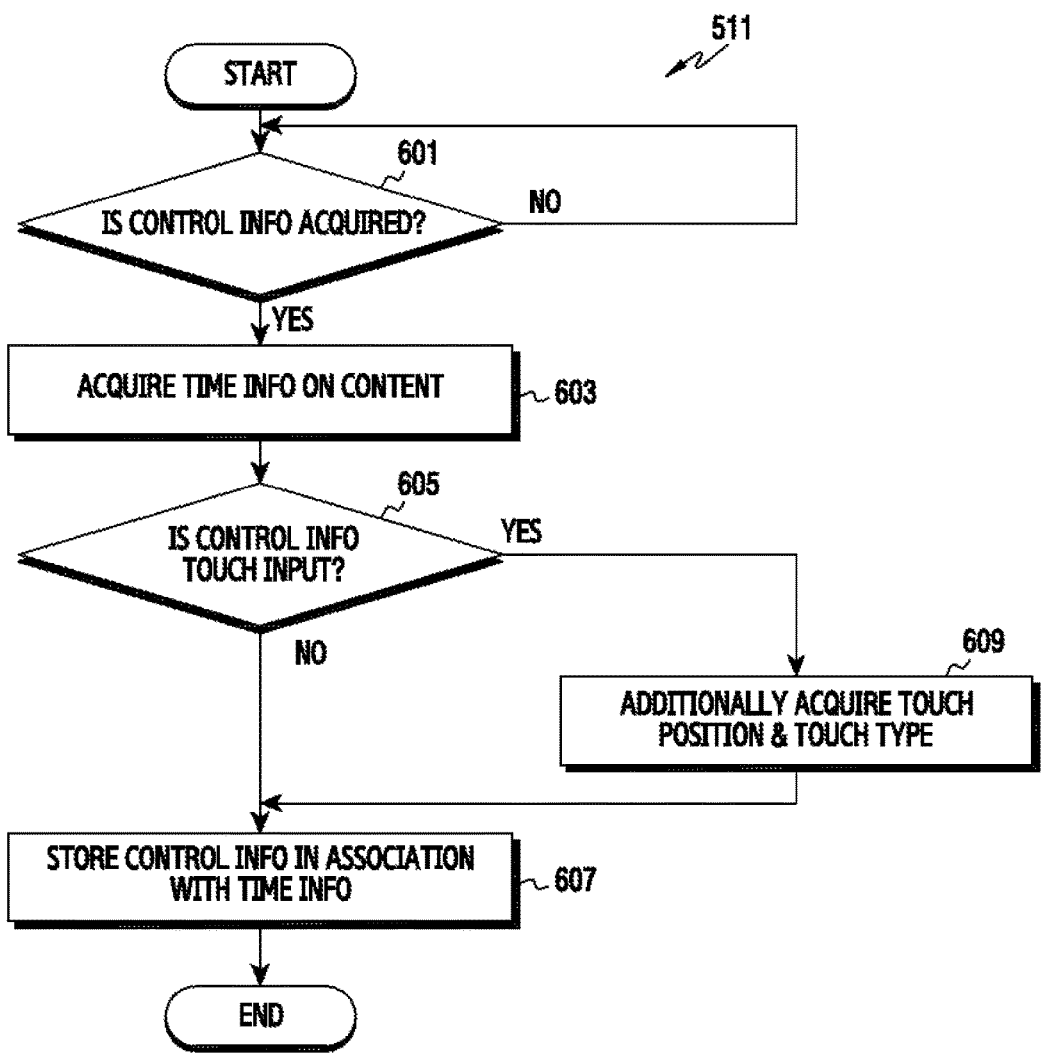
FIG. 6 is a flowchart illustrating an execution process of a method for acquiring control information by an electronic device according to various embodiments of the present disclosure.

FIG. 6 is a flowchart illustrating an execution process of a method for acquiring control information by the electronic device 101 (shown in FIG. 1) according to various embodiments of the present disclosure. According to an embodiment of the present disclosure, the electronic device 101 may be the electronic device 201 (shown in FIG. 2), the processor 120 (shown in FIG. 1), and the processor 400 (shown in FIG. 4A).

According to various embodiments of the present disclosure, the execution process of the method for acquiring control information may be detailed operations of operation 511 illustrated in FIG. 5.

Referring to FIG. 6, in operation 601, the electronic device 101 may determine whether the control information has been acquired through at least one sensor for acquiring control information. According to an embodiment of the present disclosure, the at least one sensor for acquiring control information may include at least one of a touch sensor, a touch screen, a microphone, a gyro sensor, and a gesture sensor.

When it is determined in operation 601 that the control information has not been acquired, the electronic device 101 may re-determine whether the control information has been acquired. As an example, the electronic device 101 may perform a control information acquisition operation.

When it is determined in operation 601 that the control information has been acquired, the electronic device 101 may acquire time information on content in operation 603. According to various embodiments of the present disclosure, the time information may be associated with an execution time period of the content which is related to a time point of acquiring the control information. For example, the electronic device 101 may acquire a frame number as the time information with respect to content including multiple frames. The electronic device 101 may determine the time point of acquiring the control information on the basis of the time information. Accordingly, when recording data is recorded, the electronic device 101 may determine a time point of outputting the control information on the basis of the time information.

In operation 605, the electronic device 101 may determine whether the acquired control information is a touch input.

When it is determined in operation 605 that the acquired control information is a touch input, the electronic device 101 may additionally acquire a touch position and a touch type in operation 609. According to an embodiment of the present disclosure, examples of the touch type may include touch (or press), move, release, and the like.

In operation 607, the electronic device 101 may store the control information together with the additionally-acquired touch position and touch type, in association with the time information.

When it is determined in operation 605 that the acquired control information is not a touch input, in operation 607, the electronic device 101 may store the acquired control information in association with the time information. For example, the electronic device 101 may store tilt information, which has been acquired as the control information of the electronic device 101, in association with the time information.

According to various embodiments of the present disclosure, at least one of operations 601 to 609 may be omitted. For example, operations 605 and 609 may be omitted.

Figure 7:
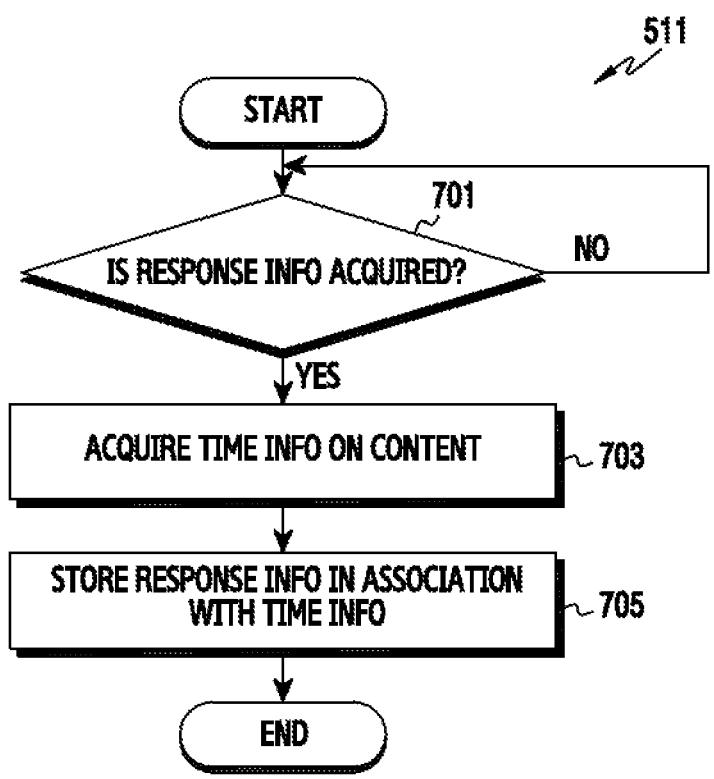
FIG. 7 is a flowchart illustrating an execution process of a method for acquiring response information by an electronic device according to various embodiments of the present disclosure.

FIG. 7 is a flowchart illustrating an execution process of a method for acquiring response information by the electronic device 101 according to an embodiment of the present disclosure. According to an embodiment of the present disclosure, the electronic device 101 may be the electronic device 201 (shown in FIG. 2), the processor 120 (shown in FIG. 1), and the processor 400 (shown in FIG. 4A).

According to various embodiments of the present disclosure, the execution process of the method for acquiring response information may be detailed operations of operation 511 illustrated in FIG. 5.

Referring to FIG. 7, in operation 701, the electronic device 101 may determine whether the response information has been acquired through at least one sensor for acquiring response information. According to an embodiment of the present disclosure, the at least one sensor for acquiring response information may include at least one of a biometric sensor, a magnetic sensor, an acceleration sensor, an inertial sensor, a microphone, and a vibration sensor.

When it is determined in operation 701 that the response information has not been acquired, the electronic device 101 may re-determine whether the response information has been acquired. As an example, the electronic device 101 may perform a response information acquisition operation.

When it is determined in operation 701 that the response information has been acquired, the electronic device 101 may acquire time information on content in operation 703. According to various embodiments of the present disclosure, the time information may be associated with an execution time period of the content which is related to a time point of acquiring the response information.

In operation 705, the electronic device 101 may store the acquired response information in association with the time information.

According to various embodiments of the present disclosure, at least one of operations 701 to 705 (shown in FIG. 7) may be omitted.

Figure 8:
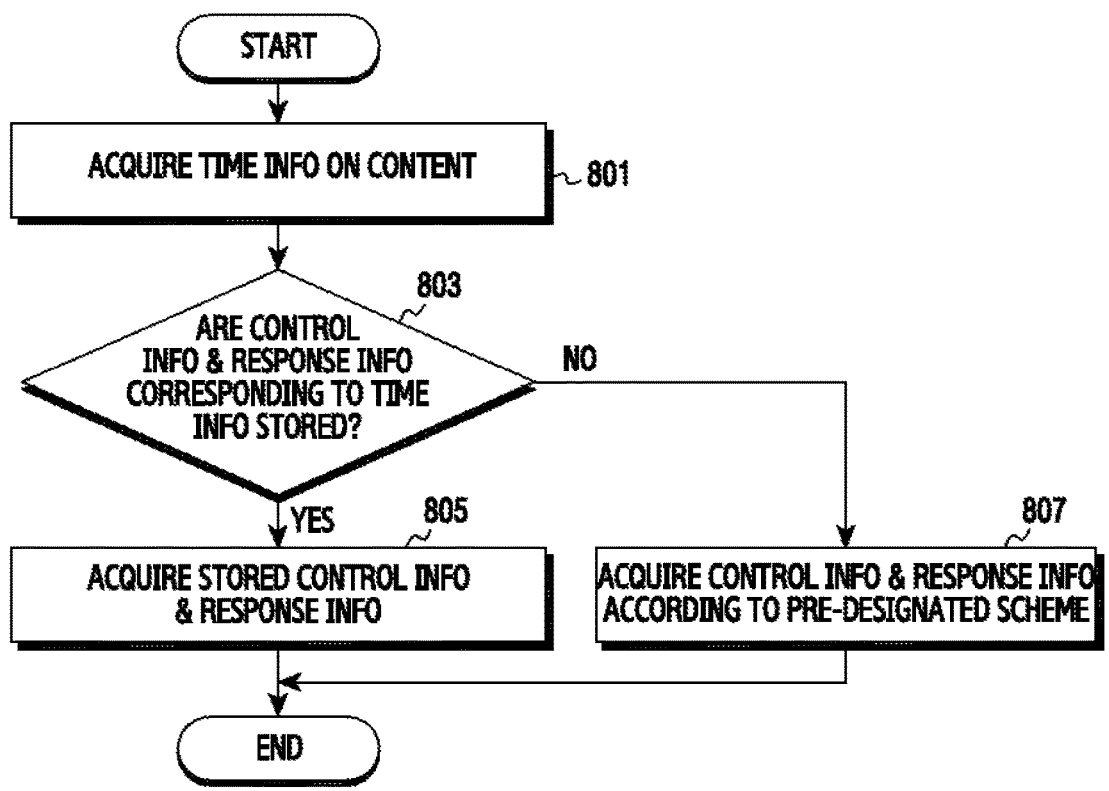
FIG. 8 is a flowchart illustrating an execution process of a method for acquiring control information and response information by an electronic device according to various embodiments of the present disclosure.

FIG. 8 is a flowchart illustrating an execution process of a method for acquiring control information and response information by the electronic device 101 according to an embodiment of the present disclosure. According to an embodiment of the present disclosure, the electronic device 101 may be the electronic device 201, the processor 120, and the processor 400. According to various embodiments of the present disclosure, the electronic device 101 may acquire control information and response information, which correspond to an execution time period of content, in a state of storing at least one piece of information among the control information and the response information which are stored in association with an execution time period of pre-designated content.

Referring to FIG. 8, in operation 801, the electronic device 101 may acquire time information on content. For example, the electronic device 101 may acquire information on a frame, which is currently being displayed on the screen, with respect to content including multiple frames.

In operation 803, the electronic device 101 may determine whether control information and response information corresponding to the time information are stored in the electronic device 101. According to another embodiment of the present disclosure, the electronic device 101 may determine whether control information and response information corresponding to the time information are stored in another electronic device with which the electronic device 101 is capable of communicating.

When it is determined in operation 803 that the control information and the response information corresponding to the time information are not stored, the electronic device 101 may acquire control information and response information according to a pre-designated scheme in operation 807. According to an embodiment of the present disclosure, the electronic device 101 may acquire control information and response information by using at least one sensor.

When it is determined in operation 803 that the control information and the response information corresponding to the time information are stored, the electronic device 101 may acquire the stored control information and response information in operation 805. For example, the electronic device 101 may acquire control information and response information, which correspond to an execution time period among the pre-stored control information and response information, and may record and store the acquired control information and response information together with execution information.

Figure 9:
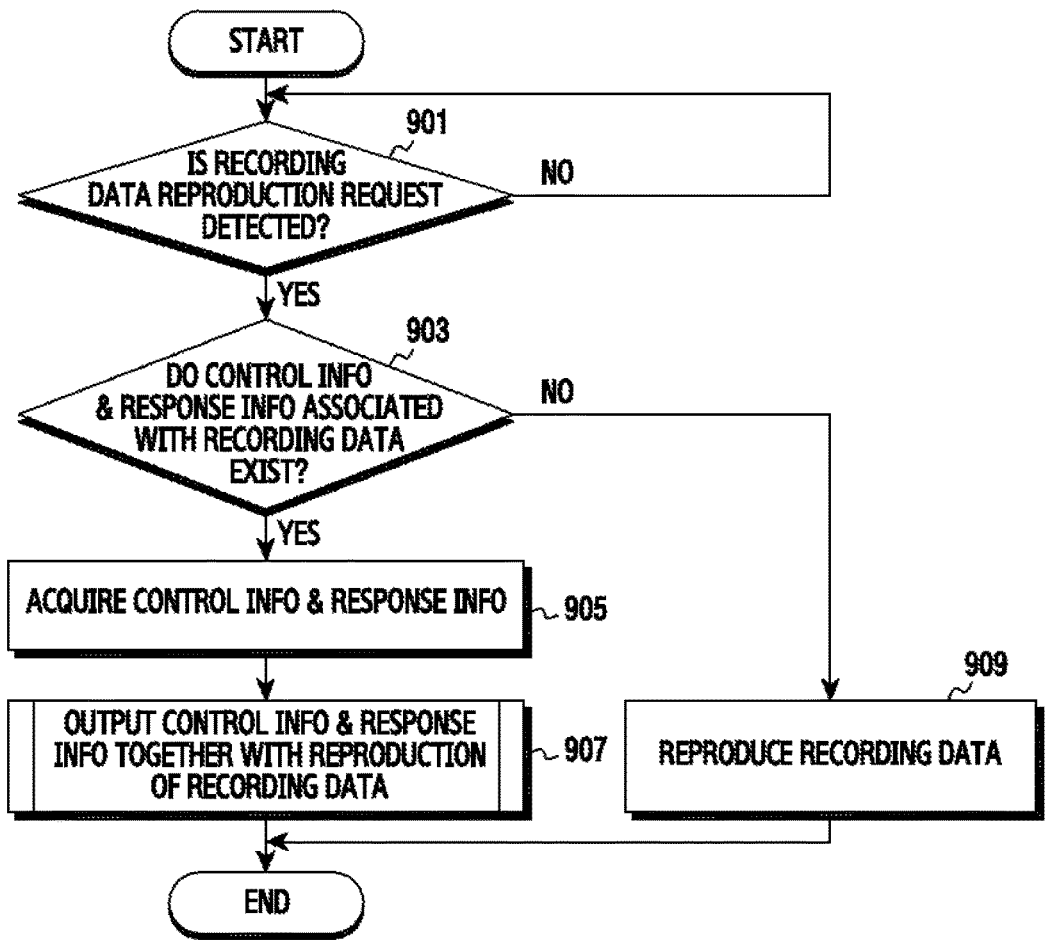
FIG. 9 is a flowchart illustrating an execution process of a method for reproducing recording data by an electronic device according to various embodiments of the present disclosure.

FIG. 9 is a flowchart illustrating an execution process of a method for reproducing recording data by the electronic device 101 according to various embodiments of the present disclosure. According to an embodiment of the present disclosure, the electronic device 101 may be the electronic device 201 (shown in FIG. 2), the processor 120 (shown in FIG. 1), and the processor 400 (shown in FIG. 4A).

Referring to FIG. 9, in operation 901, the electronic device 101 may determine whether a reproduction request for reproducing recording data has been detected.

When it is determined in operation 901 that the reproduction request has not been detected, the electronic device 101 may re-determine whether the reproduction request for reproducing recording data has been detected.

When it is determined in operation 901 that the reproduction request has been detected, the electronic device 101 may determine whether there exist control information and response information associated with the requested recording data in operation 903.

When it is determined in operation 903 that the control information and the response information do not exist, the electronic device 101 may reproduce the recording data in operation 909. According to an embodiment of the present disclosure, the electronic device 101 may display, on the screen, at least one piece of information among image information and audio information included in the recording data.

When it is determined in operation 903 that the control information and the response information exist, the electronic device 101 may acquire the control information and the response information which are associated with the requested recording data in operation 905. According to an embodiment of the present disclosure, the electronic device 101 may analyze a header of the recording data and may acquire control information and response information which are separately stored. According to another embodiment of the present disclosure, the electronic device 101 may analyze a header included in the recording data and may acquire control information and response information which exist in the recording data.

In operation 907, the electronic device 101 may output the control information and the response information together with the reproduction of the recording data.

According to various embodiments of the present disclosure, the electronic device 101 may separate a reproduction screen of the recording data from the control information and the response information, and may output the reproduction screen of the recording data separated from the control information and the response information. According to an embodiment of the present disclosure, the electronic device 101 may add a separate layer to the reproduction screen of the recording data, or may generate a separate pop-up screen on the reproduction screen of the recording data, and may output the control information and the response information by using the separate layer or on the separate pop-up screen. According to another embodiment of the present disclosure, the electronic device 101 may divide an active area into multiple areas, may output the recording data on one screen among the divided screens, and may output the control information and the response information on another screen among the divided screens. According to various embodiments of the present disclosure, the screen on which the control information and the response information are output may be controlled by an input. For example, the control may be a change of the location of the screen and a change of the size of the screen. As another example, the control may be the deactivation of an activated screen and the activation of a deactivated screen.

Figure 10:
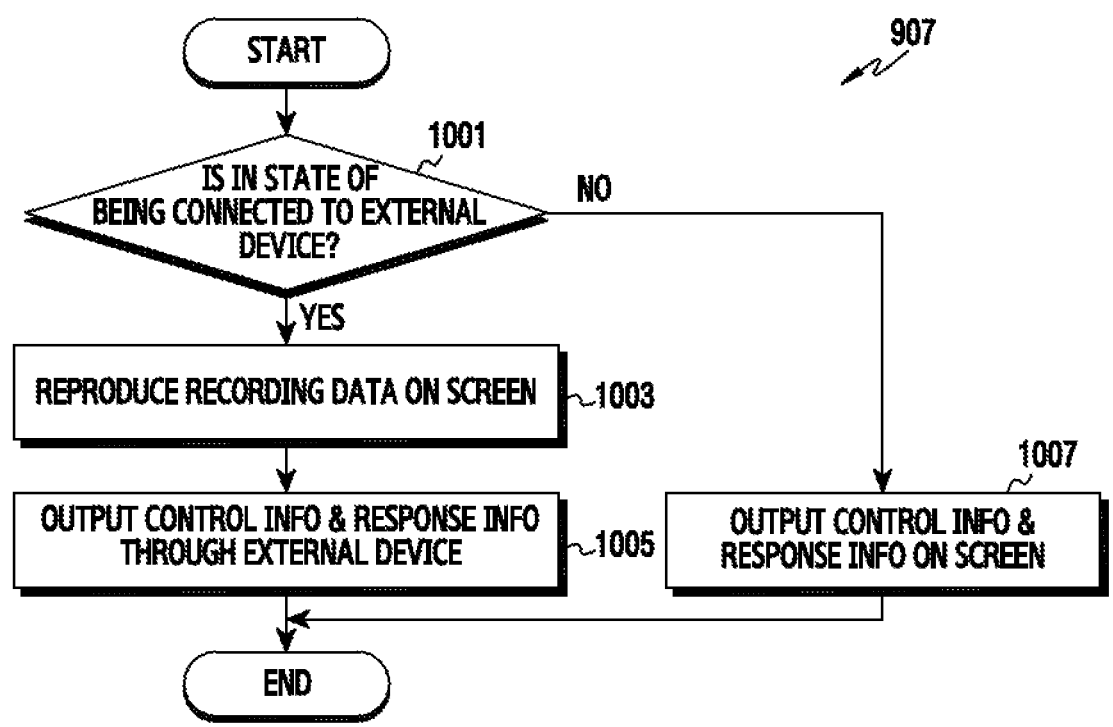
FIG. 10 is a flowchart illustrating an execution process of a method for reproducing recording data by an electronic device according to various embodiments of the present disclosure.

FIG. 10 is a flowchart illustrating an execution process of a method for reproducing recording data by the electronic device 101 according to various embodiments of the present disclosure. According to an embodiment of the present disclosure, the electronic device 101 may be the electronic device 201 (shown in FIG. 2), the processor 120 (shown in FIG. 1), and the processor 400 (shown in FIG. 4A).

According to various embodiments of the present disclosure, the execution process of the method for reproducing recording data may be detailed operations of operation 907 illustrated in FIG. 9.

Referring to FIG. 10, in operation 1001, the electronic device 101 may determine whether the electronic device 101 is in a state of being connected to an external device. According to an embodiment of the present disclosure, the electronic device 101 may determine whether there exists another electronic device to which the electronic device 101 is connected on the basis of a short-range communication scheme. Examples of the external device may include an electronic device capable of contacting at least one part of the body and an electronic device existing around the electronic device 101.

When it is determined in operation 1001 that the electronic device 101 is not in the state of being connected to the external device, the electronic device 101 may output control information and response information on the screen of the electronic device 101 in operation 1007. For example, the electronic device 101 may output the control information and the response information while reproducing the recording data on the screen of the electronic device 101.

When it is determined in operation 1001 that the electronic device 101 is in the state of being connected to the external device, the electronic device 101 may reproduce the recording data on the screen of the electronic device 101 in operation 1003. In addition, in operation 1005, the electronic device 101 may output the control information and the response information through the external device. In an embodiment of the present disclosure, there is no limit to a method for outputting control information and response information, and the control information and the response information may be output by using various methods. For example, the electronic device 101 may output the control information and the response information on the screen of the electronic device 101, and may reproduce the recording data through the external device. In addition, the electronic device 101 may output the recording data and the control information on the screen of the electronic device 101, and may output the response information through the external device. According to various embodiments of the present disclosure, the electronic device 101 may designate an object to be output on the basis of attributes of the control information and the response information. For example, the electronic device 101 may output control information and response information having the form of text through the external device, and may output control information and response information having the form of vibration through the electronic device 101.

Figure 11:
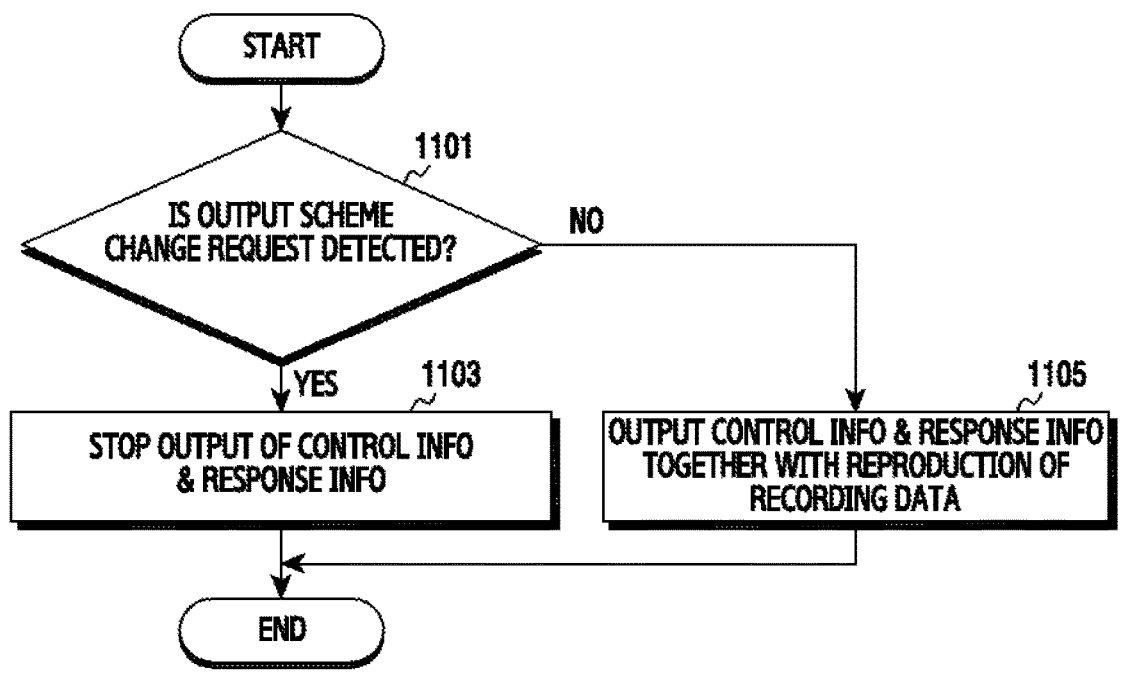
FIG. 11 is a flowchart illustrating an execution process of a method for reproducing recording data by an electronic device according to various embodiments of the present disclosure.

FIG. 11 is a flowchart illustrating an execution process of a method for reproducing recording data by the electronic device 101 according to various embodiments of the present disclosure. According to an embodiment of the present disclosure, the electronic device 101 (shown in FIG. 1) may be the electronic device 201 (shown in FIG. 2), the processor 120 (shown in FIG. 1), and the processor 400 (shown in FIG. 4A).

According to various embodiments of the present disclosure, the execution process of the method for reproducing recording data may be detailed operations of operation 907 illustrated in FIG. 9.

Referring to FIG. 11, in operation 1101, while the electronic device 101 reproduces the recording data, the electronic device 101 may determine whether an output scheme change request for changing an output scheme has been detected.

When it is determined in operation 1101 that the output scheme change request has not been detected, the electronic device 101 may output control information and response information while reproducing the recording data in operation 1105.

When it is determined in operation 1101 that the output scheme change request has been detected, the electronic device 101 may stop the output of the control information and the response information in operation 1103. According to an embodiment of the present disclosure, the electronic device 101 may stop the output of at least one piece of information among the control information and the response information.

Figure 12:
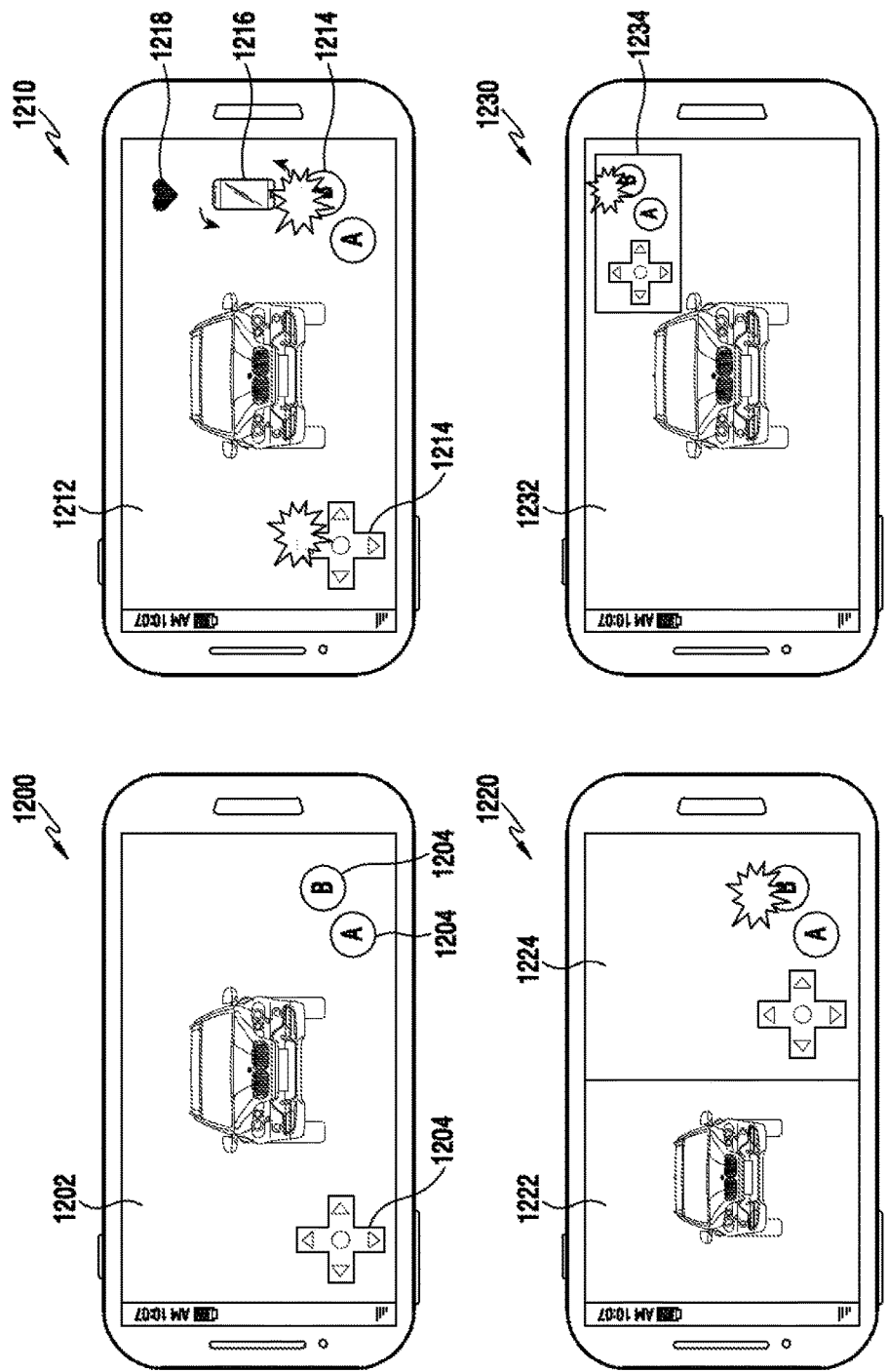
FIG. 12 is a view illustrating a configuration of a screen of an electronic device for processing recording data according to various embodiments of the present disclosure.

FIG. 12 is a view illustrating a configuration of a screen of the electronic device 101 for processing recording data according to an embodiment of the present disclosure.

According to various embodiments of the present disclosure, the electronic device 101 may execute at least one piece of content, and may output (as indicated by reference numeral 1200) execution information on the executed content. According to an embodiment of the present disclosure, according to the execution of the content, the electronic device 101 may output an execution screen on the screen thereof, and may output an effect sound through the speaker. For example, when game content is executed, the electronic device 101 may display execution information including a game execution screen 1202 and a virtual control pad 1204. The virtual control pad 1204 may include a direction key that controls the movement of at least one object displayed on the game execution screen 1202, a selection key that selects the at least one object, and the like.

According to various embodiments of the present disclosure, the electronic device 101 may record and store the output execution information. According to various embodiments of the present disclosure, the electronic device 101 may store control information and response information which are acquired while a recording operation is performed. According to an embodiment of the present disclosure, the electronic device 101 may record information acquired while the recording operation is performed, wherein the information is, for example, information associated with at least one of an input by a user which touches the virtual control pad 1204, a voice of the user received as input through the microphone, the movement of the electronic device 101 measured on the basis of at least one sensor, and biometric information of the user.

According to various embodiments of the present disclosure, with reference to FIG. 12, when the electronic device 101 reproduces recording data, the electronic device 101 may output (as indicated by reference numeral 1210) control information and response information together with a reproduction screen. According to an embodiment of the present disclosure, when the electronic device 101 reproduces recording data on game content, the electronic device 101 may reproduce, on the screen, a content control situation and a response state of the user which occur while a recording operation is performed, on the basis of the stored information. For example, the electronic device 101 may output control information and response information which are associated with a reproduction time point while reproducing the recording data.

According to various embodiments of the present disclosure, when the electronic device 101 reproduces the recording data, the electronic device 101 may output (as indicated by reference numeral 1212) control information and response information on a separate second screen having a size identical to that of a first screen that outputs the recording data. According to an embodiment of the present disclosure, the second screen may be a transparent layer. The electronic device 101 may output the control information on the second screen, and thereby may express (as indicated by reference numeral 1214) a scheme in which the user controls the virtual control pad when the electronic device 101 performs the recording operation. In addition, the electronic device 101 may output the control information on the second screen, and thereby may express (as indicated by reference numeral 1216) a scheme in which the user rotates the electronic device 101 when the electronic device 101 performs the recording operation. In addition, the electronic device 101 may output biometric information on the second screen, and thereby may express (as indicated by reference numeral 1218) a physical change of the user which occurs when the electronic device 101 performs the recording operation.

According to various embodiments of the present disclosure, with reference to FIG. 12, when the electronic device 101 reproduces the recording data, the electronic device 101 may divide an output screen into a first screen and a second screen, and may output (as indicated by reference numeral 1220) the recording data on the first screen and the second screen. According to an embodiment of the present disclosure, the electronic device 101 may output (as indicated by reference numeral 1222) a reproduction screen of the recording data on the first screen, and may output (as indicated by reference numeral 1224) the control information and the response information on the second screen.

According to various embodiments of the present disclosure, when the electronic device 101 reproduces the recording data, the electronic device 101 may output (as indicated by reference numeral 1230) a separate screen in the form of a pop-up window. According to an embodiment of the present disclosure, the electronic device 101 may output the control information and the response information on a pop-up screen 1234 displayed on a screen 1232 on which the recording data is reproduced.

Figure 13:
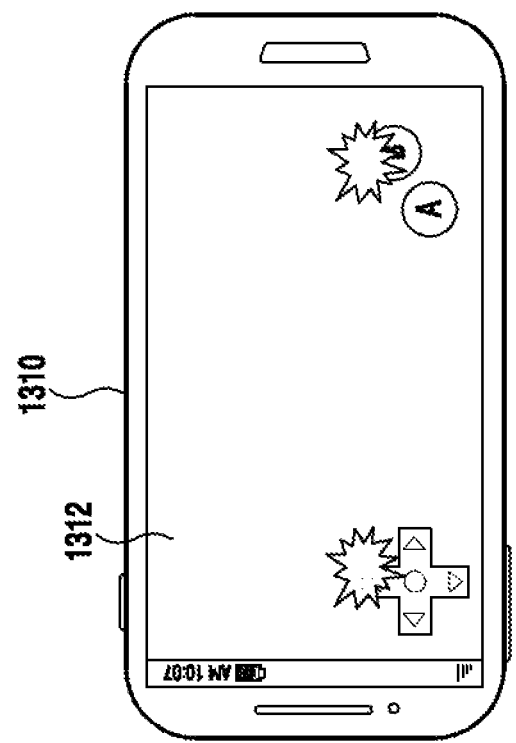
FIG. 13 is a view illustrating a configuration of a screen of an electronic device for reproducing recording data according to various embodiments of the present disclosure.
Figure 13:
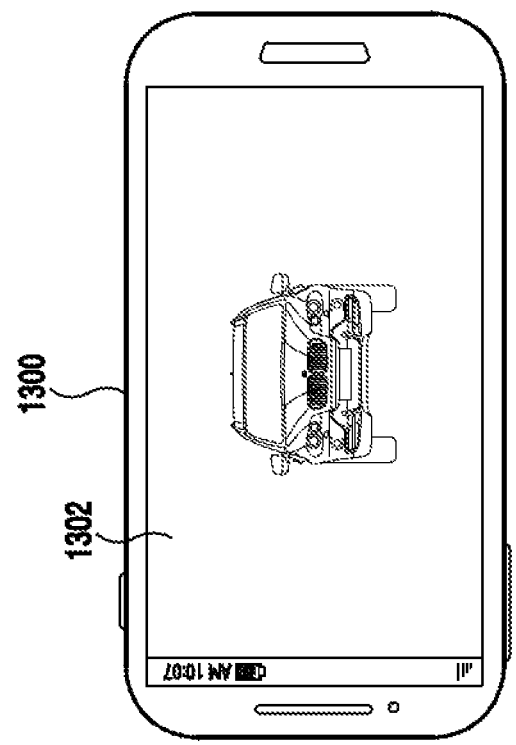

FIG. 13 is a view illustrating a configuration of a screen of an electronic device for reproducing recording data according to various embodiments of the present disclosure.

Referring to FIG. 13, the electronic device 1300 may reproduce the recording data in a state of forming communication with at least one external device 1310. According to an embodiment of the present disclosure, the electronic device 1300 may form communication on the basis of at least one of a wired communication scheme and a wireless communication scheme.

According to various embodiments of the present disclosure, with reference to FIG. 13, the electronic device 1300 may perform a process for outputting a reproduction screen of the recording data on a screen 1302 of the electronic device 1300, and may perform a process for outputting control information and response information on a screen 1312 of the external device 1310 with which the electronic device 1300 forms the communication. Without being limited thereto, the electronic device 1300 may perform a process for outputting the control information and the response information on the screen 1302 of the electronic device 1300, and may perform a process for outputting the reproduction screen of the recording data on the screen 1312 of the external device 1310. According to various embodiments of the present disclosure, the electronic device 1300 may perform a process for outputting the recording data and the control information on the screen 1302 of the electronic device 1300, and may perform a process for outputting the response information through the external device 1310. According to various embodiments of the present disclosure, the electronic device 1300 may perform a process for outputting only at least one piece of response information among the multiple pieces of response information through the external device 1310. For example, in a state of storing vibration information and biometric information as the response information, the electronic device 1300 may perform a process for outputting only the vibration information through the external device 1310. In addition, when the external device 1310 is not capable of processing the response information having the form of vibration, the external device 1310 may output response information by outputting alternative information. For example, the external device 1310 may convert the response information having the form of vibration into response information having the form of text, an image, and the like, and may output the converted response information.

An operating method of an electronic device according to various embodiments of the present disclosure may include: executing content; confirming at least one part of the content; recording the at least one part of the content; acquiring additional information collected by at least one sensor while the at least one part of the content is recorded; and storing the collected additional information in association with recording data.

According to various embodiments of the present disclosure, the additional information collected by the at least one sensor may be associated with at least one piece of information among emotional information of a user, biometric information, touch input information, voice command information, and tilt information of the electronic device.

According to various embodiments of the present disclosure, the additional information collected by the at least one sensor may include information acquired by an external device that forms communication with the electronic device.

According to various embodiments of the present disclosure, the storing of the collected additional information in association with the recording data may include: acquiring time information associated with a time point of collecting the additional information; and storing the time information in association with the recording data.

According to various embodiments of the present disclosure, the time information may be associated with reproduction of the content.

According to various embodiments of the present disclosure, the operating method of the electronic device may include outputting at least one part of additional information associated with the reproduced recording data when the recording data is reproduced. According to an embodiment of the present disclosure, the operating method of the electronic device may include outputting the at least one part of the additional information, which is associated with the recording data, through an external device. According to an embodiment of the present disclosure, the operating method of the electronic device may include controlling an output of the additional information when the recording data is reproduced.

According to various embodiments of the present disclosure, the operating method of the electronic device may include recording the additional information collected by the at least one sensor. According to an embodiment of the present disclosure, the recorded additional information is associated with at least one of an input of a user, a voice of the user, a measured movement of the electronic device, and biometric information of the user.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120 shown in FIG. 1), may cause the one or more processors to execute the function corresponding to the instruction. The computer-readable storage medium may be, for example, the memory 130 (shown in FIG. 1).

The computer readable recoding medium may include a hard disk, a floppy disk, magnetic media (e.g., a magnetic tape), optical media (e.g., a compact disc rOM (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

The method for recording an execution screen and the electronic device for processing the same, according to various embodiments of the present disclosure, can additionally store control information and response information as well as execution information when recording data is generated, and can confirm a content control situation and a response of the user to content in the case of generating the recording data.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
a memory; and
a processor configured to:
execute an application,
record and store an execution screen of the application as recorded content,
while recording the execution screen of the application, acquire control information and response information, the control information being associated with an input which controls a function or an operation of the executed application, and the response information comprising a haptic effect occurring while executing the application,
in response to acquiring the control information and the response information, store the control information and the response information in association with the execution screen as the recorded content, and
when the recorded content is reproduced, display a visual representation of the control information together with the recorded content, and provide the haptic effect included in the response information.

2. The electronic device of claim 1, wherein the processor is further configured to acquire the response information, which includes the haptic effect, from the application.

3. The electronic device of claim 1, wherein the processor is further configured to acquire the response information, which includes the haptic effect, from an external device connected to the electronic device.

4. The electronic device of claim 1, wherein the processor is further configured to associate the haptic effect based on situation information related to the electronic device or a user of the electronic device.

5. The electronic device of claim 1, wherein the processor is further configured to associate the haptic effect based on situation information related to an external device connected to the electronic device through a communication module.

6. The electronic device of claim 1, wherein the response information is stored as metadata associated with the recorded content.

7. The electronic device of claim 1, wherein the response information is stored in the recorded content.

8. The electronic device of claim 1, wherein the processor is further configured to:
identify an attribute related to the application,
when the attribute corresponds to a first designated value, store first haptic information, which enables the haptic effect to be performed as a first value, in the response information, and
when the attribute corresponds to a second designated value, store second haptic information, which enables the haptic effect to be performed as a second value, in the response information.

9. The electronic device of claim 1, wherein the processor is further configured to:
identify an attribute related to the application,
when the attribute corresponds to a first designated attribute, store first haptic information, which enables the haptic effect to be performed as a first haptic effect, in the response information, and
when the attribute corresponds to a second designated attribute, store second haptic information, which enables the haptic effect to be performed as a second haptic effect, in the response information.

10. The electronic device of claim 1,
wherein the processor is further configured to:
while recording the execution screen of the application, acquire additional information using a sensor, and
store the additional information in association with the recorded content, and
wherein the additional information comprises at least one of emotional information of a user, or biometric information.

11. The electronic device of claim 1, wherein the processor is further configured to:
transmit the control information and the response information to an external device that is in communication with the electronic device to display the control information on the external device and to provide the haptic effect included in the response information via the external device.

12. A method for recording by an electronic device, the method comprising:
executing an application;
recording and storing an execution screen of the application as recorded content;
while recording the execution screen of the application, acquiring control information and response information, the control information being associated with an input which controls a function or an operation of the executed application, and the response information comprising a haptic effect occurring while executing the application;

in response to the acquiring of the control information and the response information, storing the control information and the response information with the recorded content in association with the execution screen as the recorded content; and when the recorded content is reproduced, displaying a visual representation of the control information together with the recorded content, and providing the haptic effect included in the response information.

13. The method of claim 12, further comprising:
acquiring additional information using a sensor;
storing the additional information,
wherein the additional information comprises at least one of emotional information of a user, or biometric information, and
wherein the control information comprises at least one of touch input information, voice command information, or tilt information of the electronic device.

14. The method of claim 13, further comprising:
outputting the additional information associated with the recorded content, when the recorded content is reproduced.

15. The method of claim 13, further comprising:
acquiring time information associated with the additional information; and
storing the time information in association with the recorded content.

16. The method of claim 15, wherein the time information is associated with reproduction of the content.

17. The method of claim 12, further comprising receiving additional information that is collected by at least one sensor of an external device that is in communication with the electronic device.

18. The method of claim 12, further comprising:
acquiring time information associated with the control information or the response information; and
storing the time information in association with the recorded content.

19. The method of claim 18, wherein the time information is associated with reproduction of the content.

20. The method of claim 12, further comprising:
transmitting the control information and the response information to an external device that is in communication with the electronic device to display the control information on the external device; and
providing the haptic effect included in the response information via the external device.

* * * * *